United States Patent [19]

Sumitomo et al.

[11] Patent Number: 5,336,080

[45] Date of Patent: Aug. 9, 1994

[54] CATHODE-RAY TUBE PHOSPHOR

[75] Inventors: Miyuki Sumitomo; Ichiro Takeoka; Shoichi Bando, all of Anan, Japan

[73] Assignee: Nichia Chemical Industries, Ltd., Tokushima, Japan

[21] Appl. No.: 991,746

[22] Filed: Dec. 17, 1992

[30] Foreign Application Priority Data

Dec. 26, 1991 [JP] Japan .................................. 3-345550

[51] Int. Cl.$^5$ .............................................. C09K 11/02
[52] U.S. Cl. ................... 428/407; 252/301.36; 427/64; 427/68; 427/219; 427/220; 427/221; 428/404
[58] Field of Search ............... 252/301.36; 427/64, 427/66, 67, 68, 215, 219–221; 428/404, 407

[56] References Cited

U.S. PATENT DOCUMENTS 2,621,134 12/1952 Welch ................................... 427/66
4,233,336 11/1980 Verdult et al. ....................... 427/67

FOREIGN PATENT DOCUMENTS 53-78986  7/1978 Japan .
57-125283 8/1982 Japan .
59-25874  2/1984 Japan .

OTHER PUBLICATIONS

Database WPI Section Ch, Week 33, Derwent Publications Ltd. London, GB; Class A85, AN-7859441 & JP-A-53 078 986 (Dainippon) Jul. 1978 Abstract.
Patent Abstracts of Japan vol. 6, No. 223 (C-133) Nov. 1982 & JP-A-57 125 283 (Tokyo Shibaura) Aug. 4, 1982 Abstract.

*Primary Examiner*—Jack Copper
*Attorney, Agent, or Firm*—Nixon & Vanderhye

[57] ABSTRACT

A cathode-ray tube phosphor is manufactured by coating, on the surfaces of phosphor particles, a mixture of a metal alginate containing at least one type of a metal selected from the group consisting of Zn, Al, and an alkali earth metal and at least one type of a water-soluble binder selected from the group consisting of gum arabic, gelatin, polymethacrylamide, and polyvinyl alcohol.

3 Claims, No Drawings

CATHODE-RAY TUBE PHOSPHOR

BACKGROUND OF THE INVENTION

1. Field of the Invention

The present invention relates to a phosphor for use in a cathode-ray tube, particularly a color cathode-ray tube. The present invention also relates to a method of manufacturing a phosphor for use in a cathode-ray tube, particularly a color cathode-ray tube, which includes an improved phosphor surface treatment step.

2. Description of the Related Art

As is well known, green-, blue-, and red-emitting phosphors are formed into dots or stripes on a phosphor screen of a color cathode-ray tube. A slurry process is commonly used as a method of forming this phosphor screen.

The slurry process will be described briefly below. Phosphor particles are suspended in an aqueous solution mainly containing PVA and ammonium bichromate to prepare a coating slurry. A faceplate is placed in a coating machine, such as a spin coater. The coating slurry is poured onto the inner surface of the faceplate placed and spread over the entire surface. Thereafter, the faceplate is spun at a predetermined rate to spin away an excess slurry. The coated slurry is dried to form a coating film. This coating film is exposed through a shadow mask having a predetermined dot-like or stripe-like pattern. The exposed coating film is developed, and an excess phosphor layer is washed away to form a phosphor screen having the predetermined pattern on the faceplate. For a phosphor screen for a color cathode-ray tube, this process is performed in sequence for green-, blue-, and red-luminescent phosphors.

A phosphor screen formed by the use of this slurry process is generally required to have the following characteristics:

i) Dense dots or stripes are formed with an uniform film thickness.
 ii) Dots or stripes are formed precisely. That is, after phosphors of individual colors are coated, all dots or stripes are coated at predetermined positions with predetermined shape, width, and size.
 iii) Dots or stripes do not peel from a faceplate, that is binding tendency is good.
 iv) No cross contamination occurs. That is, a phosphor constituting dots or stripes of one luminescent component does not mix with nor overlap an adjacent phosphor of another luminescent component.
 v) No haze exists. That is, after an unexposed phosphor layer is washed away, no phosphor layer remains on a faceplate.

The above characteristics are influenced by the surface condition of a phosphor. For this reason, various cathode-ray tube phosphors have been developed in which various surface treatment substances are adhered or coated to phosphors to improve the surface conditions of the phosphors.

One of surface treatment substances currently most often used is silicon dioxide ($SiO_2$; to be referred to as silica hereinafter). A phosphor containing silica as a surface treatment substance is commonly obtained by adding an aqueous solution containing a silicic acid ion, or ultrafine silica to a phosphor suspension, and by adding an electrolyte solution containing, e.g., a Zn or Al ion, so that these additives flocculate on the surface of the phosphor to produce a silicate compound on it.

For example, Published Examined Japanese Patent Application No. 50-15747 discloses a method of performing a surface treatment for a phosphor using zinc silicate by adding potassium water-glass and zinc sulfate to an aqueous suspension of the phosphor; and Published Examined Japanese Patent Application No. 61-46512 discloses a phosphor which is surface-treated by silica and a zinc compound.

The phosphors described in the above Published Examined Japanese Patent Applications, however, are still unsatisfactory to meet all the characteristics of items i) to v) above.

For example, adhering zinc silicate to a phosphor can improve dispersibility of phosphor particles in the photosensitive resin solution described above, thereby satisfying the characteristics of items i), ii), and iii) above. However, since phosphor particles scatter to adjacent dots, the characteristics of items iv) and v) cannot be met.

On the other hand, the phosphor which is surface-treated with water-glass and zinc sulfate described above cannot meet any characteristics of items i) to v) above satisfactorily.

As described above, the techniques of flocculating silica by using a compound of, e.g., Zn or Al to perform a surface treatment for a phosphor satisfy the characteristics of items i) to v) above to some extent and hence are most often used presently. However, as an HDTV, a high-resolution cathode-ray tube, and the like have been developed, a strong demand has arisen for a phosphor having more excellent coating characteristics.

SUMMARY OF THE INVENTION

The present invention has been made in consideration of the above situation and has as its object to provide a cathode-ray tube phosphor capable of satisfying all the characteristics described above and particularly excellent in the characteristics of i) density, iv) cross contamination, and v) haze, and a method of manufacturing a cathode-ray tube phosphor, including an improved surface treatment step.

According to the present invention, there is provided a cathode-ray tube phosphor comprising: phosphor particles; and a surface treatment substance coated on surfaces of the phosphor particles and consisting of a mixture comprising a metal alginate containing at least one type of a metal selected from the group consisting of Zn, Al, and an alkali earth metal and at least one type of a water-soluble binder selected from the group consisting of gum arabic, gelatin, polymethacrylamide, and polyvinyl alcohol.

In addition, according to the present invention, there is provided a method of manufacturing a cathode-ray tube phosphor, comprising the steps of:

forming phosphor particles by using a phosphor material containing a phosphor matrix, an activator, and a flux;

suspending the phosphor particles in a dispersoid to prepare a phosphor slurry;

adding to the phosphor slurry at least one type of a water-soluble binder selected from the group consisting of gum arabic, gelatin, polymethacrylamide, and polyvinyl alcohol, a water-soluble alginate, and an aqueous solution containing at least one type of a metal ion selected from the group consisting of zinc, aluminum, and an alkali earth metal, as surface treating agents; and adjusting the resultant phosphor slurry to have a predetermined pH to treat the surfaces of the phosphor particles.

According to the present invention, the effects of a predetermined water-soluble binder and an alginate containing a predetermined metal, which are adhered to the surfaces of phosphor particles, make it possible to provide a cathode-ray tube phosphor superior not only in dispersibility but also in adhesion and capable of forming a good phosphor screen almost free from haze.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

DETAILED DESCRIPTION OF THE PREFERRED EMBODIMENTS

A phosphor of the present invention consists of phosphor particles, and a surface treatment substance formed on the phosphor. This surface treatment substance is a mixture of at least one type of a water soluble binder selected from the group consisting of gum arabic, gelatin, polymethacrylamide, and polyvinyl alcohol, and a metal alginate containing at least one type of a metal selected from the group consisting of Zn, Al, and an alkali earth metal.

A phosphor of the above sort can be manufactured by, e.g., the following method.

A method of manufacturing a phosphor according to the present invention generally comprises a step of forming phosphor particles and a step of performing a surface treatment for the phosphor particles formed.

To manufacture phosphor particles, a phosphor material containing a phosphor matrix, an activator, and a flux, which are mixed at a predetermined mixing ratio, is used. It is a common practice to calcine, coarsely pulverize, wash, and classify this phosphor material to obtain phosphor particles with a predetermined particle size distribution.

Subsequently, the obtained phosphor particles are subjected to a surface treatment using a surface treatment substance.

First, the phosphor particles are suspended in a dispersoid to prepare a phosphor slurry. A predetermined water-soluble binder, and an aqueous solution containing a water-soluble alginate and a predetermined metal are added as surface treating agents to the phosphor slurry. The water-soluble binder is at least one type selected from the group consisting of gum arabic, gelatin, polymethacrylamide, and polyvinyl alcohol. The aqueous solution contains a water-soluble alginate and at least one type of a metal ion selected from the group consisting of zinc, aluminum, and an alkali earth metal. Thereafter, the resultant phosphor slurry is adjusted to have a predetermined pH.

The above surface treatment process will be described in detail below by taking a case wherein gelatin and gum arabic are used as the water-soluble binders, sodium alginate is used as the water-soluble alginate, and an aqueous zinc sulfate solution is used as the aqueous solution containing a metal ion, as an example.

First, gelatin and gum arabic, sodium alginate, and an aqueous zinc sulfate solution are added to a phosphor slurry obtained by suspending a phosphor. When the aqueous zinc sulfate solution is added to the slurry containing sodium alginate, the sodium ion in sodium alginate is substituted with zinc ions in the slurry to produce water-insoluble zinc alginate, and this water-insoluble zinc alginate adheres to the surface of the phosphor. In this case, zinc alginate adheres to the phosphor surface while absorbing or occluding portions of gelatin and gum arabic dissolved in the slurry. When, for example, the pH of the slurry is adjusted to 7.2 or more using ammonia water, zinc ions remaining in the slurry form a zinc compound precipitate (e.g., basic zinc sulfate or zinc hydroxide). Hence, this zinc compound precipitate flocculates excess gelatin and gum arabic dissolved in the slurry and adheres, together with zinc alginate described above, to the surface of the phosphor. Consequently, the surface of the phosphor is treated by these surface treatment substances. These surface treatment substances are adhered more strongly by drying at 80° to 200° C. after the phosphor is separated from water.

It is also possible to adhere silica as a surface treatment additive to the surfaces of the phosphor particles thus surface-treated. Adhering silica further improves the coating characteristics of a phosphor slurry prepared by using this phosphor. Silica can be adhered only by adding, as a surface treatment additive, colloidal silica or an aqueous solution containing, e.g., a silicic acid ion, to the phosphor slurry during the above surface treatment process. With the addition of this surface treatment additive, the metal alginate produced as described above similarly absorbs or coprecipitates a portion of the silica and adheres it to the phosphor surface. In addition, upon pH adjustment, silica flocculates in the precipitate in the aqueous solution and adheres to the phosphor surface together with the water-soluble binder and zinc alginate. As the aqueous solution containing a silicic acid ion to be added, potassium water-glass or sodium water-glass, for example, can be used. Particulate silica, colloidal silica, or the like can be used as silica.

In the surface treatment process of the present invention, the water-soluble binder, silica, and the like, which cannot be completely adsorbed nor occluded by the metal alginate, can be flocculated by the precipitate of Zn, Al, or an alkali earth metal and adhered to the phosphor surface by performing pH adjustment.

As a pH adjusting agent, it is possible to use a substance that forms a precipitate of a metal salt of, e.g., Zn or Al, or a phosphate of an alkali earth metal between pH 6 and 11. Examples of such a pH adjusting agent are aqueous alkali solutions of ammonia water, sodium hydroxide, potassium hydroxide, ammonium phosphate, soda phosphate, and potassium phosphate.

Examples of the water-soluble alginate for use in the method of manufacturing a phosphor according to the present invention are alkali metal alginates, such as sodium alginate and potassium alginate.

As the aqueous solution containing a zinc, aluminum, or alkali earth metal ion, it is possible to use general water-soluble metal salts, such as zinc sulfate, zinc nitrate, aluminum sulfate, aluminum chloride, calcium chloride, and magnesium nitrate.

The amount of each of the water-soluble binder and the water-soluble alginate to be added to the phosphor slurry is adjusted to 0.001 to 1.0 wt% with respect to the phosphor. The amount of the aqueous solution containing zinc, aluminum, or an alkali earth metal is adjusted to 0.001 to 2.0 wt% as an amount of a metal contained in that aqueous solution.

When colloidal silica or the like is to be added, the addition amount is 0.01 to 1.0 wt% as an amount of silica contained in an aqueous solution of colloidal silica. If the amount of the water-soluble binder or the water-soluble alginate is less than 0.001 wt%, no preferable coating characteristics can be obtained. If the amount exceeds 1.0 wt%, phosphor particles tend to flocculate together in a slurry by the effect of the binder.

The ratio of the water-soluble alginate to the water-soluble binder is, in a weight ratio, preferably 0.01 to 10 of the water-soluble alginate to 1.0 of the water-soluble binder. If the ratio is less than 0.01 or exceeds 10, it is impossible to obtain preferable coating characteristics.

That is, substances adhered to the surface of the phosphor according to the present invention are a metal alginate substituted by at least one of Zn, Al, and an alkali earth metal, and a water-soluble binder flocculated by a phosphate or basic salt of, e.g., Zn. More preferably, silica is additionally adhered. In addition to these substances, on the phosphor surface, there is a possibility that a precipitate of a metal compound formed by adding an alkali or phosphoric acid to an aqueous solution containing Zn, Al, or an alkali earth metal adheres. However, if this substance adheres to the phosphor surface, the coating characteristics of the phosphor are not at all adversely affected.

A phosphor for use in the present invention can be any phosphor commonly used as a cathode-ray tube phosphor. Examples are green-luminescent zinc sulfide-based and zinc sulfide cadmium-based phosphors activated by copper and gold and coactivated by, e.g., aluminum and halogen; blue-luminescent zinc sulfide-based and zinc sulfide cadmium-based phosphors activated by silver and coactivated by, e.g., aluminum and halogen; and red-luminescent yttrium oxide-based and yttrium oxysulfide-based phosphors activated by europium. It is also possible to use pigment-adhered phosphors manufactured by adhering green, blue, and red pigments to these phosphors by using an organic binder, an inorganic binder, or the like.

As described above, at least one type of a water-soluble binder selected from the group consisting of gum arabic, gelatin, polymethacrylamide, and polyvinyl alcohol and a metal alginate containing at least one metal selected from the group consisting of Zn, Al, and an alkali earth metal are adhered to the surface of the phosphor of the present invention.

When a phosphor slurry is prepared using this phosphor, a best surface condition is obtained for the phosphor in the slurry. That is, this slurry has an appropriate dispersibility and cohesiveness to some extent. This surface condition of the phosphor of the present invention remarkably improves the coating characteristics of the phosphor in the slurry process.

If this dispersibility is too high, the phosphor does not settle in the phosphor slurry, and this decreases the thicknesses of dots and a phosphor layer which is formed by coating the slurry. In addition, when phosphors of different colors are coated separately several times, phosphor particles of one color are likely to scatter to a phosphor layer of another color to cause cross contamination. In contrast, if the dispersibility is too low, the density of phosphor particles is decreased with the result that the sharpness of dots or stripes is degraded.

Too high a dispersibility leads to occurrence of cross contamination as described above. Causes of this cross contamination involve, for example, a physical factor and an electrical factor.

The physical factor is that in forming phosphor layers of various colors separately several times, if the cohesiveness of a phosphor is low and a large number of fine phosphor particles exist, fine phosphor particles may be caught and remain in a gap between a phosphor layer already formed and a faceplate. The electrical factor is that a considerable difference is introduced in surface potential between phosphors if only a conventional surface treatment using a silicate is performed, and the consequent attraction causes cross contamination. Note that the surface potential generally means a specific equilibrium potential generated on the surface of a substance when the substance is dipped in a solvent. Substances having surface potentials close to each other repel each other, and substances having surface potentials separated from each other attract each other.

According to the present invention, when the phosphor surface is treated with a water-soluble binder and metal alginate, the binder adheres to fine phosphor particles, thereby the fine phosphor particles cohere each other to form secondary particles. Therefore, the number of fine phosphor particles is reduced to make it possible to maintain cohesiveness to a certain extent. This eliminates the above physical factor. As the binder used in forming phosphor layers on a faceplate, polyvinyl alcohol, polyvinyl pyrrolidone, and polyvinyl stilbazolium are often used. A phosphor layer once formed contains a large amount of this binder. In coating a phosphor slurry of one color on a faceplate on which a phosphor layer of another color is already formed, the organic binder adhered to the phosphor of the present invention acts to decrease the difference in surface potential between the phosphor slurry and the phosphor layer. Therefore, an electrostatic attraction hardly occurs between the phosphor in the slurry and the phosphor layer. This removes the above electrical factor. The present invention will be described in more detail below by way of its embodiments.

EMBODIMENTS

Embodiment 1

1 kg of a ZnS:Cu,Al phosphor as a green-luminescent phosphor was suspended in 3l of deionized water (to be referred to as water hereinafter) to prepare a phosphor suspension. 5 ml of a 10% aqueous gelatin solution and 50 ml of a 1% hot aqueous sodium alginate solution were added as water-soluble binders to the prepared suspension, and the resultant mixture was stirred.

0.5g of colloidal silica ( SNOWTEX N: available from Nissan Chemical Industries, Ltd. ) was added to the resultant solution under stirring. 20 ml of a 10% aqueous zinc sulfate ($ZnSO_4$) (about 0.08% as an amount of Zn with respect to a phosphor) were added to the solution still under stirring, and the mixture was stirred for 10 minutes.

Ammonia water was dropped in the resultant phosphor suspension under stirring to adjust the pH of the solution to 7.4. After the pH adjustment, the solution was stirred for 10 minutes, and the stirring was stopped. The resultant solution was left to stand to settle the phosphor.

Thereafter, the phosphor suspension was transferred to a Nutsche funnel in which a filter paper was placed. The phosphor was separated by vacuum suction using a vacuum pump and washed with 5l of water.

The phosphor was removed from the Nutsche funnel and dried at 110° C. overnight. The resultant phosphor was screened through a 200-mesh screen to obtain a phosphor of interest.

Embodiments 2-14 & Comparative Examples 1-11

Phosphors were prepared following the same procedures as in Embodiment 1 except that the type of a phosphor used, the types and addition amounts of a water-soluble binder, sodium alginate as an alginate, silica, Zn, Al, and an alkali earth metal, and the pH value were altered as shown in Table 1.

100 parts by weight of each obtained phosphor were mixed with 110 parts by weight of water, 7.5 parts by weight of polyvinyl alcohol prepared to have a normal use concentration, 0.4 parts by weight of ammonium bichromate, and 0.7 parts by weight of a surfactant, thereby preparing a coating slurry. Each coating slurry was coated into dots on a faceplate, and the characteristics of the obtained phosphor layer were evaluated. The evaluation results are summarized in Table 2.

Note that in the table, the amount of each phosphor is 1 kg and the amount (g) of silica is represented by a converted amount of $SiO_2$. Note also that a pigment-adhered $Y_2O_2$ phosphor of Embodiment 14 was prepared by adhering 0.3 wt% of red iron oxide to phosphor particles by using 0.3% gelatin and sodium alginate.

The evaluations of characteristics were conducted as follows.

EVALUATION OF CROSS CONTAMINATION

In the case wherein a blue-emitting phosphor and a green-emitting phosphor were coated sequentially in this order, for example, ultraviolet rays were radiated from the outer surface of a faceplate to cause luminescence on the phosphor screen, and particles of the blue-emitting phosphor remaining on dots of the green-emitting component per unit area (0.2 mm ×0.2 mm) were counted by using an optical microscope. The counts thus obtained at ten locations were averaged. This is represented by B/G. In the case of a reverse coating order, the average number of particles of a green-emitting phosphor remaining on a blue-emitting component is represented by G/B. Likewise, the average number of particles of a red-emitting phosphor remaining on a blue-emitting component is represented by R/B, and the average number of particles of a red-emitting phosphor remaining on dots of a green-emitting component is represented by R/G.

EVALUATION OF HAZE

After a phosphor layer was formed, phosphor particles remaining in a form other than a dot shape of interest on a faceplate were counted by using an optical microscope, and the average value of counts at ten locations was calculated.

EVALUATION OF DENSITY

A phosphor surface obtained by forming a phosphor layer was illuminated with a fluorescent lamp from the outer surface of a faceplate, and light transmitted through dots was observed by an optical microscope. Each density was evaluated based on a maximum of 5 points assuming that the density of dots of a conventional phosphor obtained in comparative example 1 was 3 points as standards.

Control 1 shows characteristics of a conventional phosphor treated with typical surface treatment substance consisting of deposit of silica and Zn compound. The phosphor on control 1 is not sufficient in cross contamination and haze characteristics.

Control 2 shows characteristics of a conventional phosphor treated with gelatin and sodium alginate. The phosphor on control 2 is not sufficient in cross contamination and haze characteristics, but is improved slightly as compared with Control 1. However even the improved conventional phosphor is remarkably inferior than a phosphor according to the invention, treated by a substance comprising a water soluble binder, alginate, and Zn compound.

A conventional phosphor on Control 3 comprises a surface substance comprising a deposit of Zn alginate and Zn compound thereon, this one shows further improved characteristics than Control 2, but is inferior as compared with the phosphor according to the present invention.

It is apparent from Control 2 and 3 that sufficient density, cross contamination and haze characteristics can be not achieved whenever one component among an aqueous binder, metal and alginate is not comprised in a surface treatment substance.

A conventional phosphor on Control 4 comprises a surface substance comprising deposit of an aqueous binder and Zn compound (not contains alginate). However no improvement appears in density, cross contamination and haze characteristics.

It appears that the phosphor according to the invention comprising all the components that is an aqueous binder, metal such as Zn, and alginate is superior than the conventional phosphor such as control 4 not comprising at least one of these components.

As described above, these components is significant for improvement in density, cross contamination and haze characteristics.

Preferably, silica can be used as an additional component on a surface treatment substance as shown in Embodiment 1 and 2. When silica is used, this can improves not only density, cross contamination and haze characteristics but precision, binding tendency. In Embodiments 3 to 5 and Controls 5 and 6, typical blue emitting phosphors are used as phosphor particles. These embodiments also represent good characteristics as compared with these controls. Embodiments 6 to 9 and Controls 7 to 11 relate to phosphors in which typical red emitting phosphor are used as phosphor particles. These embodiments show good characteristics as well as the other embodiments as compared with these controls.

Additional advantages and modifications will readily occur to those skilled in the art. Therefore, the invention in its broader aspects is not limited to the specific details, representative materials, and embodiments described herein. Accordingly, various modifications may be made without departing from the spirit or scope of the general inventive concept as defined by the appended claims and their equivalents.

TABLE 1

| Embodiment | Type of phosphor | Water-soluble binder type | Water-soluble binder addition amount, ml | Addition amount of 1% sodium alginate, ml | Silica type particle size | Silica addition amount, g | Zn, Al etc. type | Zn, Al etc. addition amount, ml | pH adjustment type | pH |
|---|---|---|---|---|---|---|---|---|---|---|
| Embodiment 2 | ZnS:Cu, Al | 10% gelatin | 5 | 20 | Particulate silica 0.1 μm | 0.5 | 10% ZnSO4 | 20 | NaOH | 7.4 |
| Control 1 | " | — | — | — | Particulate silica 0.1 μm | 0.5 | 10% ZnSO4 | 20 | NaOH | 7.4 |
| Control 2 | " | 10% gelatin | 5 | 20 | — | | — | | NaOH | 7.4 |
| Control 3 | " | — | | 20 | — | | 10% ZnSO4 | 20 | NaOH | 7.4 |
| Control 4 | " | 10% gelatin | 5 | — | — | | 10% ZnSO4 | 20 | NaOH | 7.4 |
| Embodiment 3 | ZnS:Ag, Al | 10% gelatin | 20 | 10 | Particulate silica 0.1 μm | 0.8 | 10% ZnSO4 | 15 | NaOH | 7.4 |
| Embodiment 4 | " | 10% gelatin | 12 | 20 | Particulate silica 0.1 μm | 2.5 | 10% ZnCl2 | 15 | Ammonia Water | 7.4 |
| Embodiment 5 | " | 10% gelatin / 10% gum arabic | 3 / 10 | 10 | — | | 10% ZnCl2 | 15 | Ammonia Water | 7.4 |
| Control 5 | " | — | — | — | Particulate silica 0.1 μm | 0.8 | 10% ZnSO4 | 15 | NaOH | 7.4 |
| Control 6 | " | 10% gelatin | 20 | 10 | — | | — | | NaOH | 7.4 |
| Embodiment 6 | Y2O2S:Eu | 10% gelatin / 10% gum arabic | 5 / 3 | 8 | Colloidal silica <0.1 μm | 1.0 | 10% ZnSO4 | 20 | Ammonia Water | 7.4 |
| Embodiment 7 | " | 10% gum arabic | 6 | 7 | — | | 10% AlCl3 | 20 | Ammonia Water | 7.4 |
| Embodiment 8 | " | 10% gelatin / 10% PVA | 5 / 6 | 10 | — | | 5% Al(NO)3 / 5% Na4P2O7 | 20 / 20 | HCl | 6.5 |
| Embodiment 9 | Y2O2S:Eu | 10% gelatin / 10% PVA | 3 / 7 | 20 | Colloidal silica <0.1 μm | 1.5 | 10% ZnSO4 | 25 | Ammonia Water | 7.4 |
| Embodiment 10 | " | 10% PVA / 10% PMAA | 5 / 10 | 10 | — | | 10% ZnSO4 | 15 | Ammonia Water | 7.4 |
| Embodiment 11 | " | 5% PMAA | 20 | 10 | — | | 5% CaCl2 / 5% NA2HPO4 / 5% Al(NO)3 | 15 / 10 / 5 | Ammonia Water | 6.5 |
| Control 7 | " | — | — | — | Particulate silica 0.1 μm | 0.8 | 10% ZnSO4 | 15 | NaOH | 7.4 |
| Control 8 | " | 10% gelatin | 20 | 10 | — | | — | | NaOH | 7.4 |
| Control 9 | " | | | 10 | — | | 10% ZnSO4 | 20 | NaOH | 7.4 |
| Control 10 | " | 10% gelatin | 20 | — | — | | 10% ZnSO4 | 20 | NaOH | 7.4 |
| Embodiment 12 | Y2O3:Eu | 1% gelatin | 1 | 120 | — | | 10% ZnSO4 | 20 | NaOH | 7.4 |
| Embodiment 13 | " | 10% gelatin | 50 | 3 | — | | 10% ZnSO4 | 15 | NaOH | 7.4 |
| Embodiment 14 | Pigment-adhered Y2O2S:Eu | 10% gelatin | 5 | 20 | — | | 10% ZnSO4 | 20 | NaOH | 7.4 |
| Control 11 | Pigment-adhered Y2O2S:Eu | — | — | — | — | | — | | — | |

TABLE 2

| Embodiment Comparative example | | Phosphor | Cross contamination G/B | Cross contamination B/G | Cross contamination R/G | Cross contamination R/B | Haze | Density |
|---|---|---|---|---|---|---|---|---|
| Embodiment | 1 | ZnS:Cu, Al | 5 | 8 | | | 7 | 5 |
| | 2 | " | 7 | 10 | | | 6 | 5 |
| Control | 1 | " | 120 | 103 | | | 111 | 3 |
| | 2 | " | 105 | 99 | | | 105 | 3.5 |
| | 3 | " | 90 | 88 | | | 70 | 3.5 |
| | 4 | " | 97 | 95 | | | 108 | 3 |
| Embodiment | 3 | Zns:Ag, Al | 9 | 4 | | | 9 | 5 |
| | 4 | " | 11 | 5 | | | 18 | 4.5 |
| | 5 | " | 8 | 6 | | | 8 | 5 |

TABLE 2-continued

| Embodiment Comparative example | | Phosphor | G/B | B/G | R/G | R/B | Haze | Density |
|---|---|---|---|---|---|---|---|---|
| Control | 5 | " | 116 | 105 | | | 107 | 3 |
| | 6 | " | 104 | 110 | | | 98 | 3.5 |
| Embodiment | 6 | Y2O2S:Eu | | | 9 | 8 | 9 | 5 |
| | 7 | " | | | 15 | 18 | 16 | 5 |
| | 8 | " | | | 17 | 15 | 17 | 4.5 |
| | 9 | " | | | 10 | 7 | 8 | 5 |
| Embodiment | 10 | Y2O2S:Eu | | | 15 | 20 | 19 | 4.5 |
| | 11 | " | | | 18 | 16 | 17 | 4.5 |
| Control | 7 | " | | | 98 | 90 | 95 | 3 |
| | 8 | " | | | 92 | 88 | 92 | 3.5 |
| | 9 | " | | | 78 | 78 | 70 | 3 |
| | 10 | " | | | 80 | 82 | 95 | 3.5 |
| Embodiment | 12 | Y2O3:Eu | | | 49 | 55 | 60 | 4 |
| | 13 | " | | | 59 | 61 | 58 | 4 |
| Embodiment | 14 | Pigment-adhered Y2O2S:Eu | | | 18 | 13 | 15 | 4 |
| Control | 11 | " | | | 95 | 90 | 95 | 3 |

What is claimed is:

1. A cathode-ray tube phosphor comprising phosphor particles, a water-insoluble metal alginate and a water-soluble binder, both adhering to surfaces of said phosphor particles, said phosphor being prepared by adding to a water dispersion of the phosphor (i) at least one water-soluble binder selected from the group consisting of gelatin, gum arabic, polymethacrylamide, and polyvinyl alcohol, (ii) an aqueous solution containing ions of at least one metal selected from the group consisting of zinc, aluminum, and alkali earth metal, and (iii) water-soluble alginate, and adjusting pH of said water dispersion to 6 to 11, thereby forming the water-insoluble metal alginate from said alginate and said metal ions and adhering the water-insoluble metal alginate and the water-soluble binder, flocculated by basic salt of said metal ions, to the surfaces of said phosphor particles, wherein said water dispersion contains said water-soluble binder in an amount of 0.001 to 1.0% by weight with respect to said phosphor, said aqueous solution contains said metal ions in an amount of 0.001 to 2.0% by weight with respect to said phosphor, said water dispersion contains said water-soluble alginate in an amount of 0.001 to 1.0% by weight with respect to said phosphor, and the weight ratio of said water-soluble alginate to said water-soluble binder in said dispersion is 0.011 to 10:1

2. A phosphor according to claim 1, further comprising silica adhered to the surfaces of said phosphor particles by adding to said water dispersion (iv) at least one surface treatment additive selected from the group consisting of particle silica, colloidal silica, potassium water glass, and sodium water glass.

3. A phosphor according to claim 1 wherein said phosphor particles essentially consist of at least one type of a phosphor selected from the group consisting of green-emitting zinc sulfide-based and zinc sulfide cadmium-based phosphors activated by copper and gold and coactivated by aluminum and halogen, blue-emitting zinc sulfide-based and zinc sulfide cadmium-based phosphors activated by silver and coactivated by aluminum and halogen, red-emitting yttrium oxide-based and yttrium oxysulfide-based phosphors activated by europium, and phosphors prepared by adhering a green pigment, a blue pigment, and a red pigment to said phosphors.

* * * * *